United States Patent [19]

Holz

[11] 4,188,286
[45] Feb. 12, 1980

[54] SCREENING APPARATUS FOR FIBER SUSPENSIONS

[75] Inventor: Emil Holz, Eningen, Fed. Rep. of Germany

[73] Assignee: Hermann Finckh Maschinenfabrik, Fed. Rep. of Germany

[21] Appl. No.: 887,123

[22] Filed: Mar. 16, 1978

[30] Foreign Application Priority Data

Mar. 23, 1977 [DE] Fed. Rep. of Germany ....... 2712715

[51] Int. Cl.² ............................................. B07B 1/20
[52] U.S. Cl. .................................. 209/273; 210/415; 210/512 R
[58] Field of Search ............... 209/270, 273, 268, 300, 209/303–306; 210/380, 412, 413, 415, 512 R

[56] References Cited

U.S. PATENT DOCUMENTS

| | | | |
|---|---|---|---|
| 3,400,820 | 9/1968 | Nelson | 209/306 |
| 3,677,402 | 7/1972 | Holz | 209/270 |
| 3,933,649 | 1/1976 | Ahlfors | 209/304 |
| 3,939,065 | 2/1976 | Ahlfors | 209/270 |

Primary Examiner—Frank W. Lutter
Assistant Examiner—Jon Hokanson
Attorney, Agent, or Firm—Leydig, Voit, Osann, Mayer & Holt, Ltd.

[57] ABSTRACT

A screening apparatus for fiber suspensions comprising a stationary cylindrical screen one side of which is in flow communication with the inlet for the fiber suspension and the other side, from which the accepted stock emerges, forming an annular space with a rotor comprising a cylindrical wall having elevations for producing positive and negative pressure thrusts serving to keep the screen clear and openings behind the projections through which some of the accepted stock passes to provide an alternative path to the outlet for the accepted stock.

9 Claims, 3 Drawing Figures

SCREENING APPARATUS FOR FIBER SUSPENSIONS

The invention relates to a screening apparatus for fiber suspensions comprising a stationary cylindrical screen cage which is traversed by the fiber suspension to be sorted flowing from the one side to the other, further comprising a rotor which has a hollow cylindrical, substantially closed circumferential wall and is concentrically mounted relative to the screen cage, and also comprising an outlet for the accepted stock which is connected to the annular space between the screen cage and the circumferential wall of the rotor.

In screening apparatuses of this kind, so-called clearing strips or cleaning blades which extend approximately in the direction of the rotor axis and upon rotation of the rotor produce positive and negative pressure thrusts to prevent the openings in the screen cage from becoming clogged are mounted on the outside of the circumferential wall of the rotor. Cylindrical rotors are preferred to those having cantilever cleaning blades on carrier arms, because the latter require a substantially higher power output to drive the rotor, and also cause comparatively strong vibrations in the accepted stock, which can have a disadvantageous effect on the uniformity of the sheet formation if the screening apparatus is located directly in front of a paper machine. On the other hand, cylindrical rotors have the disadvantage that the accepted stock directly behind the openings in the screen cage avail of only a relatively small flow cross-section, namely the annular space between the screen cage and the circumferential wall of the rotor. Moreover, one often endeavours to make this annular space as narrow as possible, as it is then sufficient to have comparatively low clearing strips or cleaning blades on the circumferential wall of the rotor, which, in turn, further decreases the power requirement for driving the rotor and the strength of the vibrations in the accepted stock.

The aim of the invention was to create a screening apparatus, more particularly, a pressure screening apparatus, which requires comparatively low power output for driving the rotor, and nevertheless, does not offer the flow of accepted stock such high flow resistance as the known sorting apparatuses of the aforementioned kind. According to the invention, this aim is attained by the latter being provided with openings in the circumferential wall of the rotor for passage of the accepted stock therethrough, and by the interior of the rotor likewise being connected to the accepted stock outlet. In this way, the flow of accepted stock avails of a second path to the accepted stock outlet of the screening apparatus, and at the same time all the other advantages of a screening apparatus comprising a cylindrical rotor are maintained.

In view of a negative pressure existing behind the elevations forming the cleaning blades or clearing strips, which has the effect of creating particularly high flow velocities through the openings in the screen cage, it is advisable to arrange the openings in the circumferential wall of the rotor behind these elevations, in the direction of rotation of the rotor, as a relatively large amount of accepted stock then flows off via the interior of the rotor, even in the event of the openings being comparatively small.

Instead of a small number of cleaning blades extending along the entire length of the circumferential wall of the rotor, in a preferred embodiment of the invention a large number of comparatively short elevations is used, which are offset, i.e., mounted in staggered arrangement in the circumferential direction of the rotor. The vibrations in the flow of accepted stock are thereby further decreased.

Finally, in order to ensure that fibers do not accumulate at the—in the direction of rotation—rear edges of the openings in the circumferential wall of the rotor, it is advisable to round off these edges. Furthermore, it is preferable to arrange on the inside of the circumferential wall of the rotor rounded off elevations having an airfoil cross-section and—in the direction of rotation—adjoining the rear edges of the openings.

Further features, advantages and details of the invention are given in the enclosed claims and/or the following specification and the attached drawings of a preferred embodiment of an inventive pressure sorting apparatus.

Figure 1:
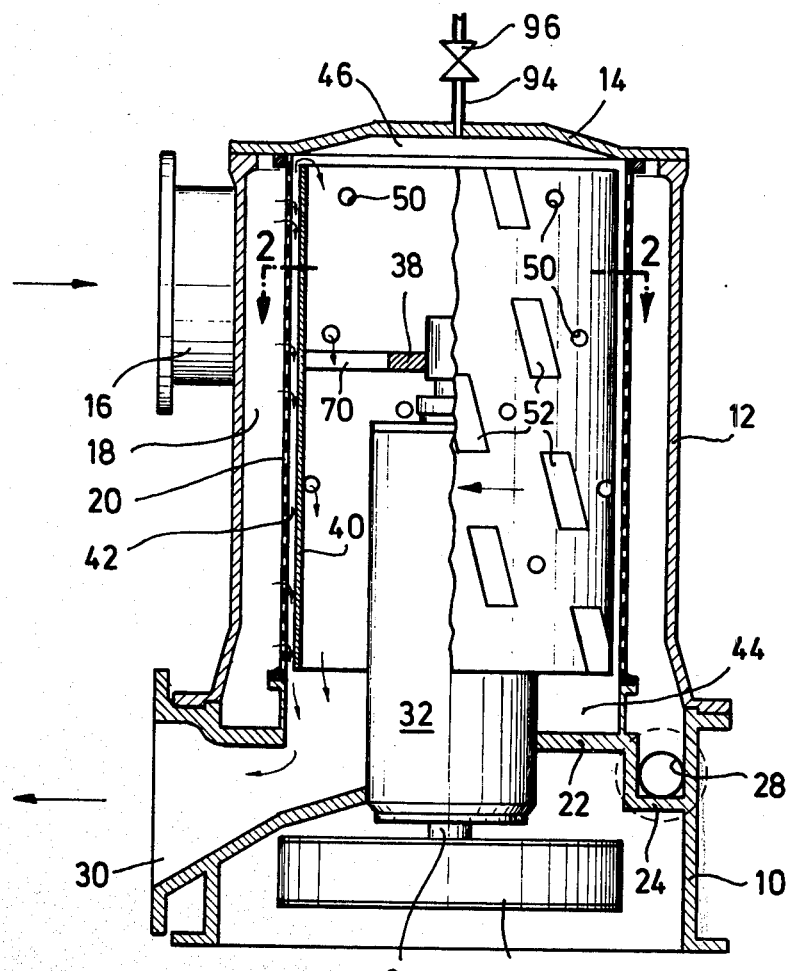
FIG. 1 is a vertical section through the pressure screening apparatus.

The pressure screening apparatus illustrated in FIG. 1 comprises a casing consisting of a base portion 10, a circumferential wall 12 and a cover 14. An inlet nozzle 16 which is connected to an outer annular space 18 between the circumferential wall 12 of the casing and a screen cage 20 forms an integral part of the circumferential wall of the casing. The screen cage extends from a separation wall 22 in the base portion 10 of the casing to the cover 14 and ends at the bottom in a rejected stock gutter 24 which is formed in the separation wall 22 and is connected to an outlet nozzle 28 in the base portion of the casing. An outlet nozzle 30 for the so-called accepted stock which will be referred to later also forms an integral part of the base portion of the casing.

The base portion 10 of the casing comprises a bearing support means 32, in which a rotor axis 34 is mounted for rotation. A pulley 36 is secured at the bottom of the rotor axis and a supporting disc 38 with a rotor consisting of a hollow cylinder which is open at the top and the bottom attached thereto is secured at the top of the rotor axis. Since the rotor consists of only a circumferential wall, only the circumferential wall of rotor 40 will be referred to in the following. Since the rotor axis 34 extends concentrically relative to the screen cage 20, the latter and the circumferential wall of the rotor 40 together constitute a uniformly narrow annular space 42, which is connected at the bottom to an accepted stock area 44 and at the top to an area 46 between the upper end of the circumferential wall of the rotor 40 and the cover 14.

Figure 2:
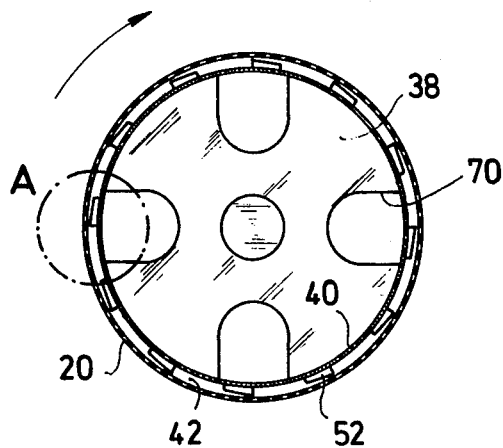
FIG. 2 is a section through the screen cage and rotor, taken along line 2—2 of FIG. 1.
Figure 3:
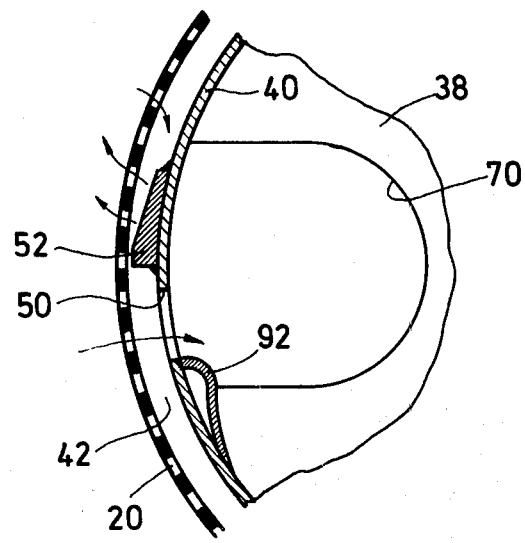
FIG. 3 is an enlarged illustration of section A in FIG. 2.

While the screen cage 20 comprises comparatively small openings in the form of bores or slits, the circumferential wall of the rotor 40 has comparatively large openings 50 which, in the direction of rotation, (see arrows in FIGS. 1 and 2) are arranged behind so-called cleaning blades 52 which have a substantially wedge-shaped cross-section (see FIG. 3), are slightly inclined relative to the longitudinal axis of the rotor in the manner shown in FIG. 1 and are mounted in staggered arrangement on the circumferential wall of the rotor. As these cleaning blades pass by, they produce positive and negative pressure thrusts on the inside of the openings in the screen cage and the positive pressure existing on the front side of the cleaning blades 52 causes a reverse flushing effect at the openings in the screen cage, while the negative pressure behind the cleaning blades results in an increase in the flowing velocity through the openings in the screen cage.

It should also be noted that the supporting disc 38 for the circumferential wall of the rotor comprises substantially U-shaped recesses 70, by means of which the upper part of the interior of the rotor is connected to its lower part. In a preferred embodiment of the invention the annular space 42 is 10 to 15 mm wide and in accordance therewith the maximum height of the cleaning blades 52 is 10 to 15 mm.

The fiber suspension which is conveyed under pressure into the pressure screening apparatus through the inlet nozzle 16 is separated by the openings in the screen cage 20 into accepted stock and rejected stock, i.e., most of the good fibers pass together with most of the water through the openings in the screen cage 20 into the annular space 42. Dirt and conglomerations of fibers settle in the outer annular space 18 and are removed via the rejected stock gutter 24 and the outlet nozzle 28. The so-called accepted stock now not only flows downwardly in the annular space 42, but can enter the interior of the rotor through the openings 50. Furthermore, the accepted stock can also flow from the annular space 42 over the upper edge of the circumferential wall of the rotor 40 into the interior of the rotor. In this way the flow resistance with which the accepted stock is confronted is quite substantially decreased. The accepted stock issuing from the lower end of the annular space 42 and the rotor and entering the accepted stock area 44 finally flows off via the outlet nozzle 30.

In order to prevent fibers from accumulating at the—in the direction of rotation—rear edge of the openings 50, this edge is not only rounded off, but also adjoins an elevation 92 consisting of a piece of sheet metal of airfoil cross-section welded to the inside of the circumferential wall of the rotor 40.

A ventilation conduit 94 having a valve 96 is provided in the cover.

The inclination of the cleaning blades 52 and the rotation of the circumferential wall of the rotor 40 together produce a downward conveying effect in the annular space 42, which accelerates removal of the accepted stock from the annular space 42.

Therefore, according to the invention a screening apparatus was created in which the power requirement for driving the rotor is low, and yet the accepted stock avails of a relatively large total flow cross-section. Furthermore, the use of a large number of relatively short cleaning blades which are mounted in staggered arrangement in the direction of travel results in a substantial decrease in the vibrations in the accepted stock. The inventive screening apparatus is therefore particularly well suited for the final screening directly in front of a paper machine.

The basic concept underlying the invention could also be applied to screening apparatuses wherein the stationary screen cage is traversed by the suspension to be sorted flowing from the inside to the outside, and wherein the screen cage is surrounded by the cylindrical, substantially closed circumferential wall of a rotor.

I claim:

1. A screening apparatus for fiber suspensions comprising a housing and a stationary cylindrical screen cage having one side in flow communication with an inlet for said fiber suspensions and further having screen openings through which fiber suspension from the inlet flows as accepted stock; a rotor having a hollow cylindrical, substantially closed circumferential wall concentrically mounted relative to the screen cage over substantially the length thereof with one side adjacent the side of the screen cage not in direct flow communication with the inlet to form an annular space between the screen cage and the circumferential wall of the rotor for accepted stock, the circumferential wall of the rotor further having elevations extending into the annular space immediately radially adjacent the screen openings for producing positive and negative pressure thrusts in the accepted stock within the annular space, and openings through which some accepted stock passes, the openings in the rotor wall being larger than the screen openings; and an outlet for the accepted stock connected to both the annular space and the opposite side of the rotor.

2. A screening apparatus as set forth in claim 1, the openings being uniformly distributed over the circumferential wall of the rotor.

3. A screening apparatus as set forth in claim 1, the elevations extending approximately in the axial direction of the rotor, the length of the elevations corresponding to a fraction of the length of the circumferential wall of the rotor and the elevations being mounted thereon in staggered arrangement.

4. A screening apparatus as set forth in claim 1, the rotor being inside the cylindrical screen and open at one end with the outlet for the accepted stock being adjacent to this end.

5. A screening apparatus as set forth in claim 1, the rotor being inside the cylindrical screen and open on both ends.

6. A screening apparatus as set forth in claim 1, further comprising, rounded off elevations adjoining the rear edges of the openings in the direction of rotation on said opposite side of the circumferential wall of the rotor, the elevations being formed into airfoils.

7. A screening apparatus as set forth in claim 1, the annular space having a width of approximately 10 to 15 mm.

8. A screening apparatus as set forth in claim 7, the elevations on the circumferential wall of the rotor having a maximum height of 10 to 15 mm.

9. A screening apparatus as set forth in claim 1, said openings being behind, in the direction of the rotation of the rotor, the elevations.

* * * * *